United States Patent
Ueyama (10) Patent No.: US 9,007,545 B2
(45) Date of Patent: Apr. 14, 2015

(54) BACKLIGHT DEVICE, DISPLAY DEVICE, AND TELEVISION SET

(75) Inventor: Munetoshi Ueyama, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/131,783

(22) PCT Filed: Jul. 9, 2012

(86) PCT No.: PCT/JP2012/067434
§ 371 (c)(1),
(2), (4) Date: Jan. 9, 2014

(87) PCT Pub. No.: WO2013/008769
PCT Pub. Date: Jan. 17, 2013

(65) Prior Publication Data
US 2014/0168526 A1 Jun. 19, 2014

(30) Foreign Application Priority Data

Jul. 14, 2011 (JP) .................. 2011-155463

(51) Int. Cl.
| F21K 99/00 | (2010.01) |
| G02F 1/1333 | (2006.01) |
| H04N 5/66 | (2006.01) |
| F21V 8/00 | (2006.01) |
| G02F 1/1335 | (2006.01) |
| H04N 5/64 | (2006.01) |

(52) U.S. Cl.
CPC ............... *F21K 9/50* (2013.01); *G02F 1/1333* (2013.01); *H04N 5/66* (2013.01); *G02B 6/0031* (2013.01); *G02F 1/1336* (2013.01); *H04N 5/64* (2013.01)

(58) Field of Classification Search
CPC .................... F21K 9/50; G02B 6/0031; G02B 6/0066–6/0095; G02F 1/1336–1/13363; H04N 5/64
USPC .............. 348/790; 362/97.1–97.4; 349/61, 67
See application file for complete search history.

(56) References Cited

U.S. PATENT DOCUMENTS

| 8,789,968 | B2 * | 7/2014 | Ohsawa et al. ............... 362/231 |
| 2007/0284564 | A1 * | 12/2007 | Biwa et al. ....................... 257/13 |
| 2010/0053498 | A1 | 3/2010 | Takemoto et al. |
| 2012/0257107 | A1 | 10/2012 | Itoh |

FOREIGN PATENT DOCUMENTS

| JP | 2011-39093 A | 2/2011 |
| JP | 2011-134785 A | 7/2011 |
| WO | 2009/001725 A1 | 12/2008 |
| WO | 2011/080954 A | 7/2011 |

\* cited by examiner

*Primary Examiner* — Anabel Ton
(74) *Attorney, Agent, or Firm* — Chen Yoshimura LLP (57) ABSTRACT

A backlight device (20) is combined with a display device (10) that has a display panel (11), such as a liquid crystal panel. The backlight device includes a chassis (21), a light guide plate (22) and optical sheets (23) arranged on the rear surface of the display panel (11), and an LED package (24) that illuminates an edge face of the light guide plate. A light reflecting face formed of a material that has silver as a main component is provided in the LED package. An adsorbing material (30) that adsorbs gas such as halogen gas and hydrogen sulfide, which have characteristics that lower the reflectance of silver, is coated onto a substrate (25) on which the LED package is mounted.

14 Claims, 8 Drawing Sheets

BACKLIGHT DEVICE, DISPLAY DEVICE, AND TELEVISION SET

TECHNICAL FIELD

The present invention relates to a backlight device, a display device including this backlight device, and a television receiver provided with this display device.

BACKGROUND ART

Display devices that use display panels that do not emit light on their own, such as liquid crystal display panels, are normally combined with an illumination device that illuminates the display panel from behind. A variety of components are used for the light source of this type of illumination device, such as cold cathode fluorescent tubes or light-emitting elements. Light-emitting diodes (hereinafter, referred to as "LEDs"), organic electroluminescent elements, inorganic electroluminescent elements and the like are used as these light-emitting elements, with LEDs now being mainstream. The light source of the illumination device disclosed in Patent Document 1 is also a white LED with a high degree of brightness.

Figure 7:
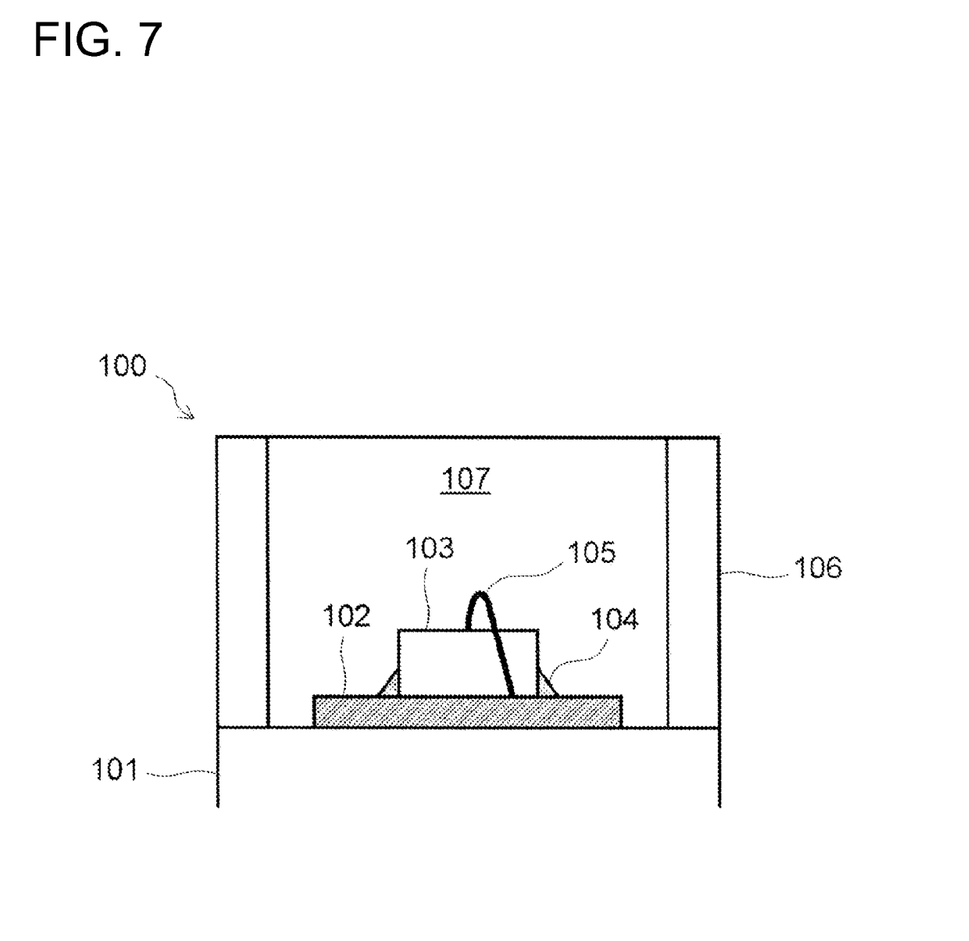
FIG. 7 is a cross-sectional view showing a configuration example of the LED package.

A configuration example of an LED used as a light source is shown in FIG. 7. A package 100 of the LED in FIG. 7 has a light reflecting face 102 for increasing the degree of brightness formed on a substrate 101, and an LED device 103 fixed above the light reflecting face 102 by a die attach adhesive 104. Wire bonding is performed with a metal wire 105 from the light reflecting face 102 to the LED device 103 to complete the electrical connection. The light reflecting face 102 is then enclosed by a reflector 106 made of a synthetic resin with high light reflectance, and a sealing resin 107 is filled inside the reflector 106 to complete the package 100.

The light reflecting face 102 is made of a material that has silver as a main component (as a matter of course, this also includes pure silver). Silver has a very high reflectance of visible light of 90% or above; therefore, it is well-suited to increase the degree of brightness. Silver plating or silver deposition is performed on the substrate 101 to form the light reflecting face 102.

While silver has a high reflectance of visible light, it is susceptible to binding with halogen gas and hydrogen sulfide. If silver makes contact with halogen gas containing a halogen element such as fluorine, chlorine, bromine, or iodine, then a silver halide will form and the silver will darken. Silver sulfide will also form if the silver makes contact with hydrogen sulfide, and the silver will darken. A problem based on this will be explained using FIG. 8.

Figure 8:
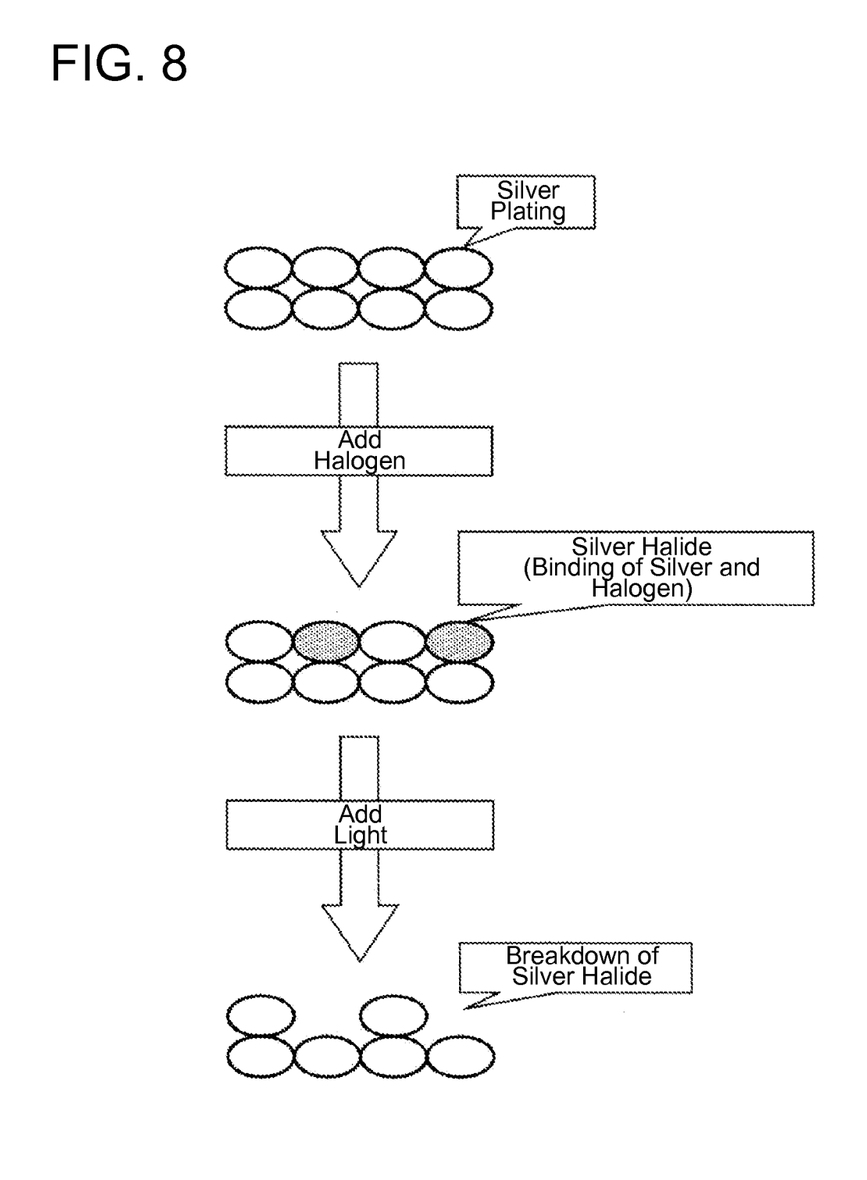
FIG. 8 is a view showing problems with the forming of silver halides.

FIG. 8 shows a group of silver particles (represented by oval shapes) in three vertical tiers. The top tier shows the silver particles formed by silver plating in an orderly arrangement. When halogen is added to this tier, a few of the silver particles bind to the halogen and form a silver halide such as silver chloride, silver bromide, silver iodide, or silver fluoride. The shaded oval shapes in the silver particle group in the middle tier represent silver halides.

When light is radiated on the silver particle group in FIG. 8, the silver halides break down into silver and halogen. This process roughens the surface of the light reflecting face. The silver particle group in the bottom tier represent this condition. If darkening occurs or the surface becomes rough in this way, or in other words, if the light reflecting face is degraded, then the reflectance of the light reflecting face will substantially decrease. As a result, the brightness of the LED package 100 will decrease.

There are components among the constituent members of the illumination device, in which the LED package 100 is included, that generate halogen gas when heated. The use of materials that generate halogen gas is being reduced in order to lessen the release of halogen gas into the natural environment; however, the replacement of halogen that is used as a fire retardant is difficult, and it is not practical to completely remove halogen.

Halogen gas passes through the sealing resin 107 of the LED package 100 to reach the light reflecting face 102. There are also cases in which tearing occurs at the boundary of the sealing resin 107 and the reflector 106, or at the boundary of the sealing resin 107 and the substrate 101, and halogen gas enters through the resulting gap. Hydrogen sulfide, which is contained in the atmosphere at hot springs and the like, causes problems similar to halogen gas.

To address the above-mentioned problems, a backlight device in Patent Document 1 includes an LED package with an LED chip and a light reflecting face that contains silver as a main material, and an optical member that adjusts light emitted from this LED package. The structure of the optical member in the backlight device is such that the release of halogens is small enough that silver halides do not form on the light reflecting face.

A reduction in reflectance of the light reflecting face can also be prevented by methods such as adopting a configuration with low oxygen transmittance for the sealing resin, or applying a coating on the light reflecting face.

RELATED ART DOCUMENT

Patent Document

Patent Document 1: WO 2009/001725A1

SUMMARY OF THE INVENTION

Problems to be Solved by the Invention

Adopting a structure for the optical member combined with the LED package that releases little halogen makes choosing materials hard and frequently leads to an increase in cost. Using a material for the sealing resin with low oxygen transmittance also requires custom-made parts, resulting in an increase in cost. The coating for the light reflecting face is also a significant factor in increased costs.

The present invention was made in view of the above issues, and aims at providing an illumination device that can prevent degradation of a light reflecting face in an LED package while using relatively low-cost materials.

Means for Solving the Problems

To achieve the above-mentioned goals, an illumination device according to the present invention includes a light emitting diode package that has a light reflecting face made of a material having silver as a main component, the light emitting diode package acting as a light source, wherein an adsorbing material that adsorbs a gas having characteristics that decrease a reflectance of silver is arranged on a periphery of the light emitting diode package.

In the illumination device with the above-mentioned configuration, it is preferable for the adsorbing material to be coated on a member provided on the periphery of the light emitting diode package.

In the illumination device with the above-mentioned configuration, it is preferable for a container having ventilation characteristics to be attached to a member provided on the periphery of the light emitting diode package, the container housing the adsorbing material.

In the illumination device with the above-mentioned configuration, it is preferable for an adhesive sheet containing the adsorbing material to be bonded to the periphery of the light emitting diode package.

In the illumination device with the above-mentioned configuration, it is preferable for the illumination device to be configured to be used as a backlight device in a display device.

In the illumination device with the above-mentioned configuration, it is preferable for the light emitting diode package to be configured to illuminate an edge face of a light guide plate, the light guide plate being arranged on a rear surface of a display panel in the display device.

In the illumination device with the above-mentioned configuration, it is preferable for the light emitting diode package to be configured to illuminate a display panel in the display device from a rear surface.

The present invention is further characterized in that a display device includes the illumination device described above, and a display panel that receives light from the illumination device.

The present invention is further characterized in that, in the display device with the above-mentioned configuration, the display panel is a liquid crystal display panel.

The present invention is further characterized in that a television receiver includes the display device with the above-mentioned configuration.

Effects of the Invention

An adsorbing material that adsorbs gas such as halogen gas and hydrogen sulfide, which have characteristics of reducing the reflectance of silver, is arranged on the periphery of the LED package. Therefore, even if such gas is generated, it is adsorbed by the adsorbing material and does not reach the light reflecting face, which is made of a material that has silver as a main component, and does not degrade the light reflecting face. The adsorbent is relatively low-cost, and thus, the aim of retaining the reflectance of the light reflecting face can be achieved without a significant increase in cost.

DETAILED DESCRIPTION OF EMBODIMENTS

Figure 1:
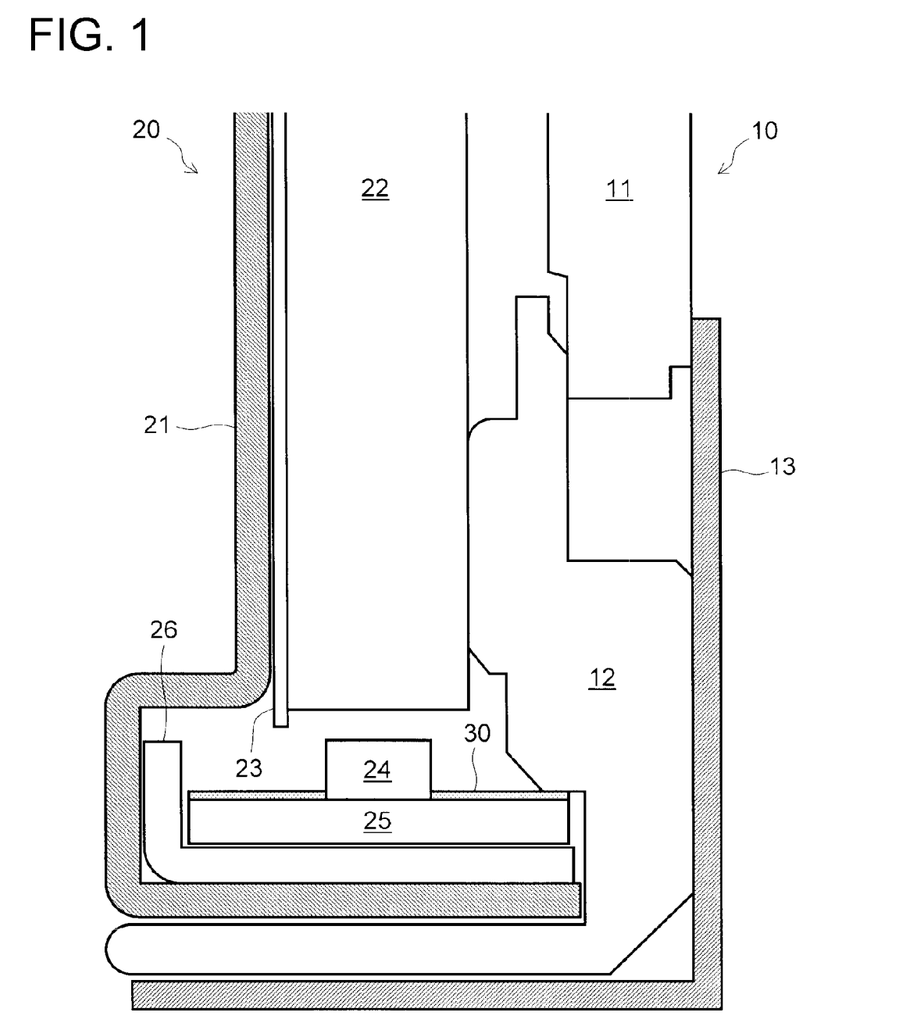
FIG. 1 is a schematic cross-sectional view showing a part of an illumination device according to Embodiment 1 of the present invention.

FIG. 1 is a vertical cross-sectional view showing main components of a display device 10 included in a television receiver. The display device 10 has a display panel 11, which is a liquid crystal panel. The display panel 11 is vertically supported by being held between a frame 12 made of a synthetic resin and a metal bezel 13.

A backlight device 20 is combined with the display device 10. The backlight device 20 is the illumination device of the present embodiment. In the backlight device 20, a metal chassis 21 vertically supports a light guide plate 22 and optical sheets 23. The light guide plate 22 and optical sheets 23 are arranged on the rear surface of the display panel 11. A reflective sheet is included in the optical sheets 23.

Figure 2:
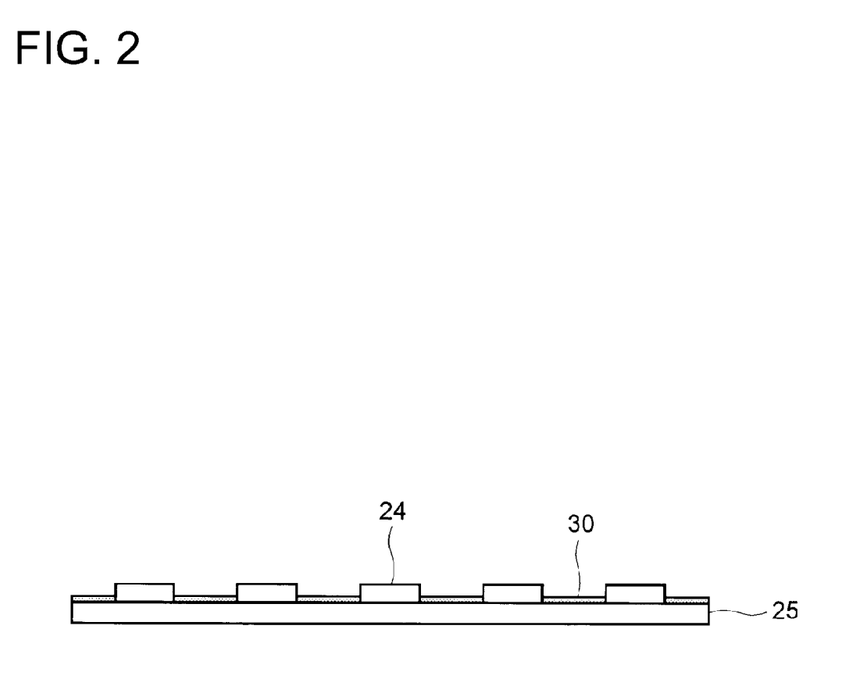
FIG. 2 is a view showing arrangement of an LED package.

A white light emitting LED package 24 is arranged below the light guide plate 22 in FIG. 1. The LED package 24 has a structure similar to a conventional LED package shown in FIG. 7 and is provided with a light reflecting face made of a material that has silver as a main component. The LED package 24 is mounted on a substrate 25, and the optical axis is arranged vertically with the center of the LED device coinciding with the center of the light guide plate 22 in the thickness direction. The horizontal direction of the display device 10 when seen from the front is the lengthwise direction of the substrate 25, and as shown in FIG. 2, a plurality of the LED packages 24 are arranged on the substrate 25 with prescribed gaps therebetween along the lengthwise direction. The substrate 25 is held by a metal substrate holding frame 26 and attached to the chassis 21.

When the LED package 24 turns on, light is emitted from the top face thereof. The emitted light illuminates a downward edge face of the light guide plate 22, and enters the light guide plate 22 from there. The direction of the light is changed inside the light guide plate 22, and the light illuminates the display panel 11 from the rear surface thereof. This causes a bright image to appear on the display panel 11.

The present invention is characterized in that an adsorbing material 30 that adsorbs gas such as halogen gas and hydrogen sulfide, which have characteristics of reducing the reflectance of silver, is arranged on the periphery of the LED package 24. The members shown in Embodiment 1, such as the frame 12, light guide plate 22, optical sheets 23, and substrate 25 include halogen, and it is possible for these members to become a source of halogen gas. Potassium permanganate or silica gel, for example, can be used as the adsorbing material 30 that adsorbs halogen gas that has been generated.

In Embodiment 1 shown in FIG. 1, the adsorbing material 30 is a coating material mixed with other materials and is coated on the surface of the substrate 25. Areas other than the substrate 25 may be coated instead of or in addition to the substrate 25.

With the above configuration, even if the members that are main components of the backlight device 20 are heated, such as the light guide plate 22 or the optical sheet 23, and generate halogen gas, the gas will be adsorbed by the adsorbing material 30 before entering the LED package 24. Therefore, the light reflecting face inside the LED package 24 will not be degraded. Accordingly, the LED package 24 will retain a high degree of brightness.

Silver plating or silver deposited parts may be formed on the surface of the substrate 25 or other members and used as the adsorbing material. The silver in these areas acts as an adsorbing material that binds with halogen gas or hydrogen sulfide before these reach the light reflecting face inside the LED package 24.

Figure 3:
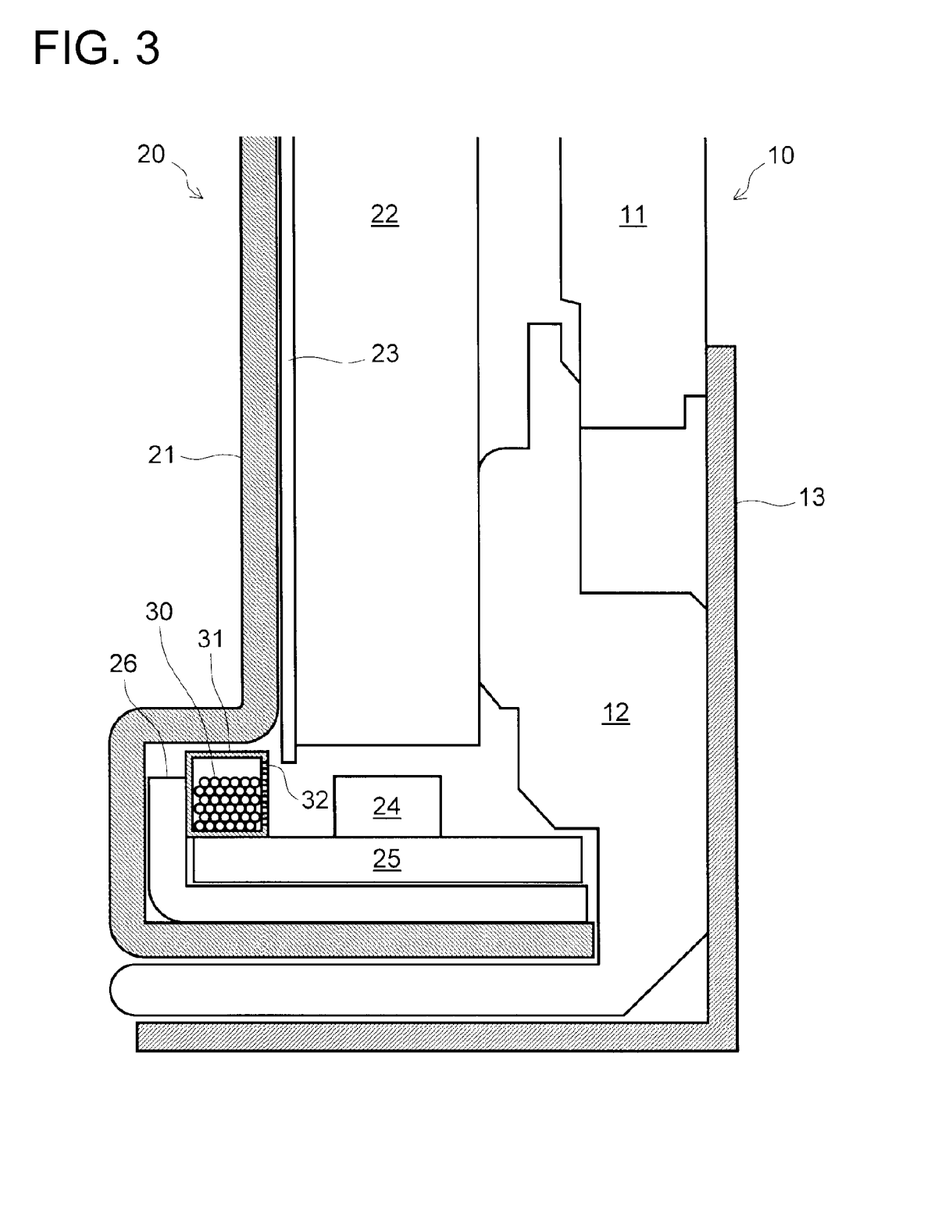
FIG. 3 is a schematic cross-sectional view showing a part of an illumination device according to Embodiment 2 of the present invention.

In Embodiment 2 shown in FIG. 3, a granular adsorbing material 30 is placed in a container 31 made of a synthetic resin, and the container 31 is disposed on the periphery of an LED package 24. The container 31 can be fixed to a substrate 25 or substrate holding frame 26 with a double-sided adhesive tape, or the like.

Ventilation holes 32, which are a set of small holes, are formed on the container 31. Thus, the container 31 has ventilation characteristics. The halogen gas enters the container 31 from the ventilation holes 32 and is adsorbed by the adsorbing material 30. The container or bag may be made with a material that has ventilation characteristics by itself, such as paper, cloth, or a non-woven material, and the adsorbing material may be put into this. The form of the adsorbing material 30 is not limited to a granular shape. The adsorbing material 30 may have a gel form or a paste form.

Figure 4:
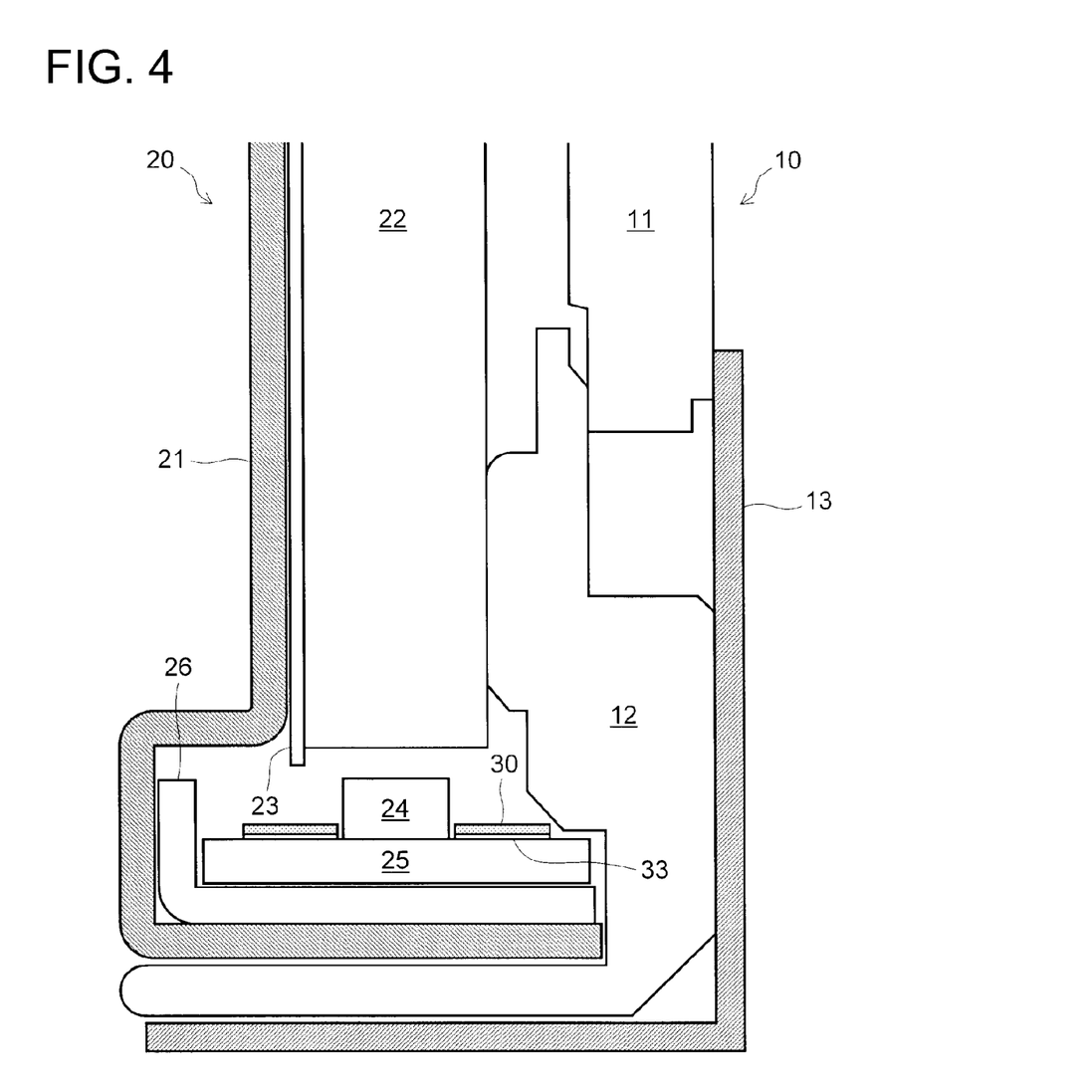
FIG. 4 is a schematic cross-sectional view showing a part of an illumination device according to Embodiment 3 of the present invention.

In Embodiment 3 shown in FIG. 4, an adsorbing material 30 is mixed with other materials and has a sheet form. An adhesive layer 33 is formed on one face of the sheet, and the sheet acts as an adhesive sheet. With such a form, the adsorbing material 30 can be attached with ease to a substrate 25 or members other than the substrate 25.

Figure 5:
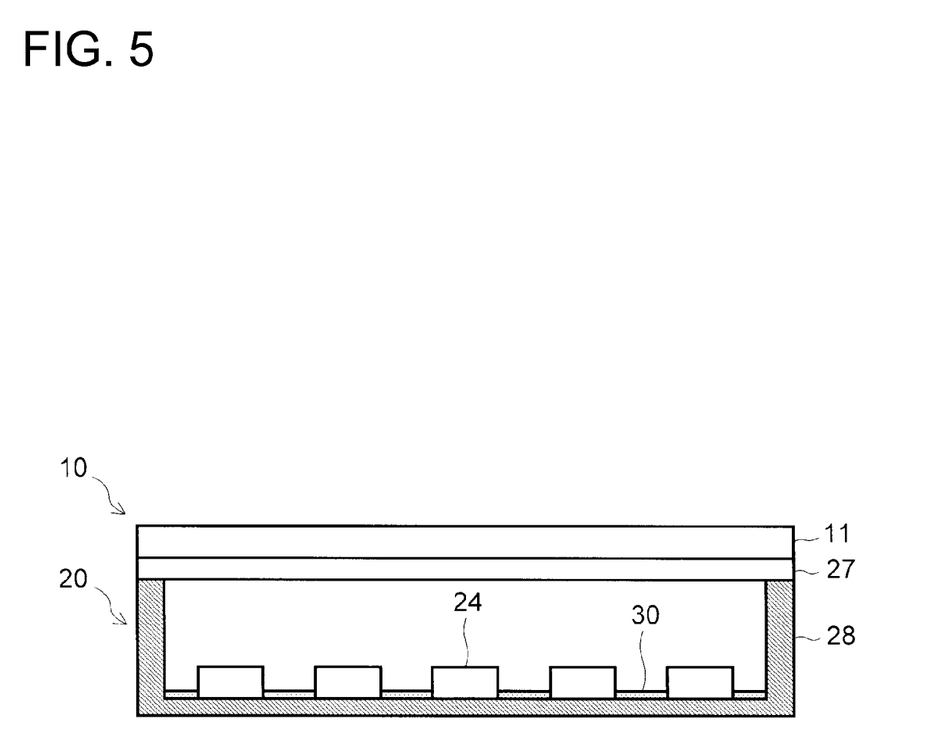
FIG. 5 is a schematic cross-sectional view showing a part of an illumination device according to Embodiment 4 of the present invention.

In Embodiment 4 shown in FIG. 5, a backlight device 20 does not have a light guide plate. An LED package 24 illuminates a display panel 11 from the rear surface thereof through optical sheets 27 that include a diffusion plate and the like. The LED package 24 is attached to the interior of a tray-shaped chassis 28, and an adsorbing material 30 is coated on the interior of the chassis 28. Needless to say, an arrangement method for the adsorbing material such as in Embodiment 2 or Embodiment 3 may be used.

Figure 6:
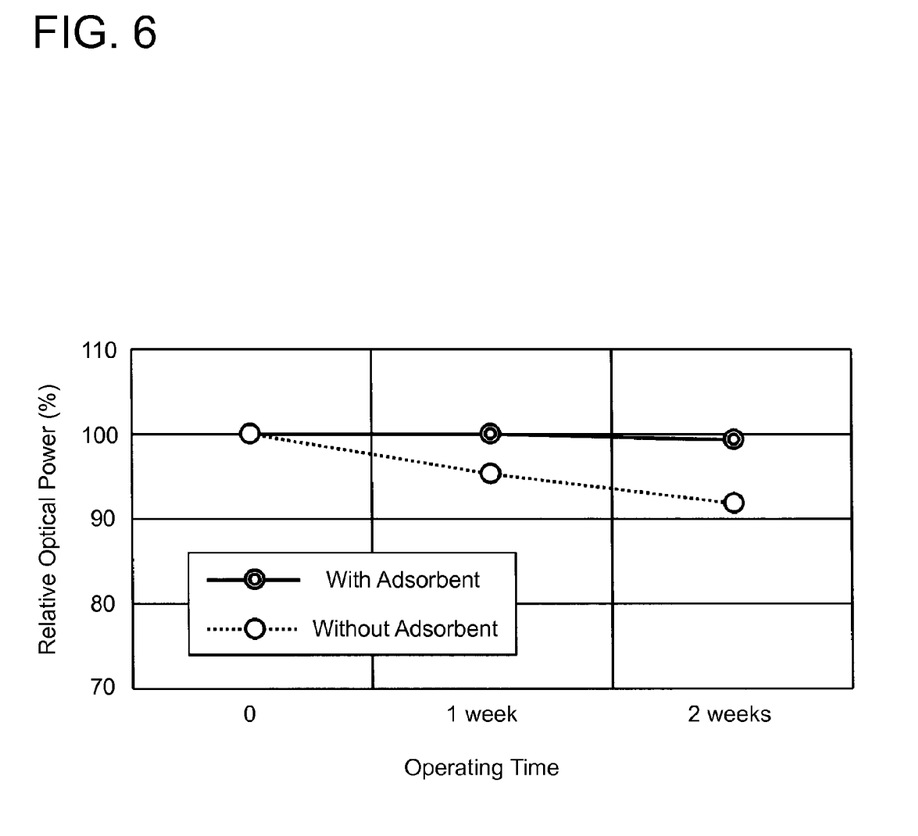
FIG. 6 is a graph showing difference in the degree of brightness with and without an adsorbent member.

Experimental results of the effects that the presence or lack of an adsorbent has on a light reflecting face are shown in FIG. 6. The test sample used an LED package (anti-sulfide) with a resin that has high gas barrier characteristics as a sealing resin, and an LED package (conventional) that used a normal grade sealing resin. Both of the sealing resins are silicone. Five of the anti-sulfide packages and five of the conventional packages constituted one set, and two of these sets were prepared. Both sets were stored for two weeks at a temperature of 25° C. and a hydrogen sulfide ($H_2S$) concentration of approximately 0.1 ppm. During that time, in one of the sets silver deposition was performed on the substrates with the LED packages bonded thereto, and this acted as the adsorbent. The thickness of the deposited silver was less than or equal to 10 microns, and the deposition range was 50% or more of the substrate surface. Silver deposition was not performed on the other set.

The vertical axis in the graph in FIG. 6 represents the degree of brightness of the LED package. The degree of brightness of the set of LED packages with the adsorbent (deposited silver) barely decreased, even after two weeks. The degree of brightness of the set of LED packages without the adsorbent (deposited silver) decreased by approximately 10% after two weeks.

The silicone that is used as the sealing resin is a generic term for an artificial polymer compound having a main structure formed by siloxane bonds, and has phenyl silicone containing a phenyl group or a methyl silicone containing a methyl group. Phenyl silicone has a lower degree of gas permeability than methyl silicone and is suitable as a gas barrier. On the other hand, phenyl silicone has lower heat and light resistance than methyl silicone, and a disadvantage of being susceptible to a decrease in brightness due to heat.

Embodiments of the present invention were described above, but the scope of the present invention is not limited thereto, and can be implemented with various modifications without departing from the spirit thereof.

INDUSTRIAL APPLICABILITY

The present invention can be applied to a wide range of illumination devices that use an LED package as a light source with a light reflecting face formed of a material that has silver as a main component. The present invention can also be applied to a wide range of display devices containing the illumination device, and television receivers provided with the display device.

DESCRIPTION OF REFERENCE CHARACTERS 10 display device
11 display panel
20 backlight device (illumination device)
21 chassis
22 light guide plate
23 optical sheets
24 LED package
25 substrate
30 adsorbing material
31 container
32 ventilation holes
33 adhesive layer

The invention claimed is:

1. An illumination device, comprising:
a light emitting diode package that has a light reflecting face made of a material having silver as a main component, the light emitting diode package acting as a light source,
wherein an adsorbing material that adsorbs a gas having characteristics that decrease a reflectance of silver is arranged on a periphery of the light emitting diode package.

2. The illumination device according to claim 1, wherein the adsorbing material is coated on a member provided on the periphery of the light emitting diode package.

3. The illumination device according to claim 1, wherein a container having ventilation characteristics is attached to a member provided on the periphery of the light emitting diode package, the container housing the adsorbing material.

4. The illumination device according to claim 1, wherein an adhesive sheet containing the adsorbing material is bonded to a member provided on the periphery of the light emitting diode package.

5. The illumination device according to claim 1, wherein the illumination device is configured to be used as a backlight device of a display device.

6. The illumination device according to claim 5, wherein the light emitting diode package is configured to illuminate an end face of a light guide plate, the light guide plate being arranged on a rear surface of a display panel of the display device.

7. The illumination device according to claim 5, wherein the light emitting diode package is configured to illuminate a display panel of the display device from a rear surface thereof.

8. A display device, comprising:
the illumination device according to claim 5; and
a display panel that receives light from the illumination device.

9. The display device according to claim 8, wherein the display panel is a liquid crystal display panel.

10. A television receiver, comprising the display device according to claim 8.

11. The illumination device according to claim 1, wherein said gas is halogen gas or hydrogen sulfide.

12. The illumination device according to claim 2, wherein said gas is halogen gas or hydrogen sulfide.

13. The illumination device according to claim 3, wherein said gas is halogen gas or hydrogen sulfide.

14. The illumination device according to claim 4, wherein said gas is halogen gas or hydrogen sulfide.

* * * * *